US012131589B2

(12) United States Patent
King et al.

(10) Patent No.: US 12,131,589 B2
(45) Date of Patent: *Oct. 29, 2024

(54) METHOD AND APPARATUS FOR AUTOMATIC LOCATION-SPECIFIC CONFIGURATION MANAGEMENT OF A REMOVABLE METER UNIT

(71) Applicant: IPS GROUP INC., San Diego, CA (US)

(72) Inventors: David William King, Rancho Santa Fe, CA (US); Alexander Schwarz, San Diego, CA (US); Stephen John Hunter, Randpark Extension (ZA)

(73) Assignee: IPS Group Inc, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/974,432

(22) Filed: Oct. 26, 2022

(65) Prior Publication Data

US 2023/0057773 A1 Feb. 23, 2023

Related U.S. Application Data

(60) Continuation of application No. 16/442,270, filed on Jun. 14, 2019, now abandoned, which is a
(Continued)

(51) Int. Cl.
*G07B 15/00* (2011.01)
*G01D 4/00* (2006.01)
(Continued)

(52) U.S. Cl.
CPC ............. *G07B 15/02* (2013.01); *G01D 4/004* (2013.01); *G01D 4/008* (2013.01); *G06Q 50/40* (2024.01); *G07F 17/24* (2013.01)

(58) Field of Classification Search
None
See application file for complete search history.

(56) References Cited

U.S. PATENT DOCUMENTS 2,161,046 A 6/1939 Hitzeman
2,822,682 A 2/1958 Sollenberger
(Continued)

FOREIGN PATENT DOCUMENTS

CA 2377010 A1 10/2001
CA 2363915 A1 5/2003
(Continued)

OTHER PUBLICATIONS

EP-1217778-A1 English Language Translation (Year: 2002).*
(Continued)

*Primary Examiner* — Curtis A Kuntz
*Assistant Examiner* — Jerold B Murphy
(74) *Attorney, Agent, or Firm* — Wilson Sonsini Goodrich & Rosati

(57) ABSTRACT

A meter apparatus and method of operating a removable meter apparatus are described. The meter apparatus includes a tag associated with unique tag identification information and configured to be permanently affixed to a location housing at a unique physical location, and includes a removable meter unit configured to mate with the location housing and receive the tag identification from the tag and report the tag identification to a data manager configured to associate an identifier of the removable meter unit with the tag identification and unique physical location, and associate configuration information for the physical location with the removable meter unit and the tag identification. The unique physical location can comprise a single-space parking location.

20 Claims, 6 Drawing Sheets

Related U.S. Application Data continuation of application No. 14/558,564, filed on Dec. 2, 2014, now Pat. No. 10,366,546, which is a division of application No. 12/355,740, filed on Jan. 16, 2009, now Pat. No. 9,002,723.

(60) Provisional application No. 61/022,208, filed on Jan. 18, 2008, provisional application No. 61/022,213, filed on Jan. 18, 2008.

(51) Int. Cl.
*G06Q 50/40* (2024.01)
*G07B 15/02* (2011.01)
*G07F 17/24* (2006.01)

(56) References Cited

U.S. PATENT DOCUMENTS

| | | |
|---|---|---|
| 2,832,506 A | 4/1958 | Hatcher |
| 2,988,191 A | 6/1961 | Grant |
| 3,183,411 A | 5/1965 | Palfi |
| 3,535,870 A | 10/1970 | Mitchell et al. |
| 3,721,463 A | 3/1973 | Attwood et al. |
| 3,999,372 A | 12/1976 | Welch et al. |
| 4,043,117 A | 8/1977 | Maresca et al. |
| 4,310,890 A | 1/1982 | Trehn et al. |
| 4,460,965 A | 7/1984 | Trehn et al. |
| 4,812,805 A | 3/1989 | Lachat et al. |
| 4,823,928 A | 4/1989 | Speas |
| 4,825,425 A | 4/1989 | Turner |
| 4,872,149 A | 10/1989 | Speas |
| 4,875,598 A | 10/1989 | Dahl |
| 4,880,097 A | 11/1989 | Speas |
| 4,895,238 A | 1/1990 | Speas |
| 5,027,390 A | 6/1991 | Hughes |
| 5,065,156 A | 11/1991 | Bernier |
| 5,201,396 A | 4/1993 | Chalabian et al. |
| 5,222,076 A | 6/1993 | Ng et al. |
| 5,244,070 A | 9/1993 | Carmen et al. |
| 5,259,491 A | 11/1993 | Ward, II |
| 5,273,151 A | 12/1993 | Carmen et al. |
| 5,351,187 A | 9/1994 | Hassett |
| 5,360,095 A | 11/1994 | Speas |
| 5,382,780 A | 1/1995 | Carmen |
| 5,442,348 A | 8/1995 | Mushell |
| 5,563,491 A | 10/1996 | Tseng |
| 5,614,892 A | 3/1997 | Ward, II et al. |
| 5,617,942 A | 4/1997 | Ward, II et al. |
| 5,640,002 A | 6/1997 | Ruppert et al. |
| 5,642,119 A | 6/1997 | Jacobs |
| 5,648,906 A | 7/1997 | Amirpanahi |
| 5,659,306 A | 8/1997 | Bahar |
| 5,710,743 A | 1/1998 | Dee et al. |
| 5,737,710 A | 4/1998 | Anthonyson |
| 5,778,067 A | 7/1998 | Jones et al. |
| 5,806,651 A | 9/1998 | Carmen et al. |
| 5,833,042 A | 11/1998 | Baitch et al. |
| 5,841,369 A | 11/1998 | Sutton et al. |
| 5,842,411 A | 12/1998 | Johnson |
| 5,845,268 A | 12/1998 | Moore |
| 5,852,411 A | 12/1998 | Jacobs et al. |
| 5,946,774 A | 9/1999 | Ramsey et al. |
| 5,954,182 A | 9/1999 | Wei |
| 6,037,880 A | 3/2000 | Manion |
| 6,078,272 A | 6/2000 | Jacobs et al. |
| 6,081,205 A | 6/2000 | Williams |
| 6,111,522 A | 8/2000 | Hiltz et al. |
| 6,116,403 A | 9/2000 | Kiehl |
| 6,195,015 B1 | 2/2001 | Jacobs et al. |
| 6,229,455 B1 | 5/2001 | Yost et al. |
| 6,230,868 B1 | 5/2001 | Tuxen et al. |
| 6,309,098 B1 | 10/2001 | Wong |
| 6,312,152 B2 | 11/2001 | Dee et al. |
| RE37,531 E | 1/2002 | Chaco et al. |
| 6,373,422 B1 | 4/2002 | Mostafa |
| 6,373,442 B1 | 4/2002 | Thomas et al. |
| 6,456,491 B1 | 9/2002 | Flannery et al. |
| 6,457,586 B2 | 10/2002 | Yasuda et al. |
| 6,467,602 B2 | 10/2002 | Bench et al. |
| 6,505,774 B1 | 1/2003 | Fulcher et al. |
| 6,697,730 B2 | 2/2004 | Dickerson |
| 6,747,575 B2 | 6/2004 | Chauvin et al. |
| 6,812,857 B1 | 11/2004 | Kassab et al. |
| 6,856,922 B1 | 2/2005 | Austin et al. |
| 6,885,311 B2 | 4/2005 | Howard et al. |
| 6,914,411 B2 | 7/2005 | Couch et al. |
| 6,929,179 B2 | 8/2005 | Fulcher et al. |
| 7,019,420 B2 | 3/2006 | Kogan et al. |
| 7,019,670 B2 | 3/2006 | Bahar |
| 7,023,360 B2 | 4/2006 | Staniszewski et al. |
| 7,027,773 B1 | 4/2006 | Mcmillin |
| 7,183,999 B2 | 2/2007 | Matthews et al. |
| 7,222,031 B2 | 5/2007 | Heatley |
| 7,237,716 B2 | 7/2007 | Silberberg |
| 7,388,349 B2 | 6/2008 | Elder et al. |
| 7,748,620 B2 | 7/2010 | Gomez et al. |
| 7,772,720 B2 | 8/2010 | Mcgee et al. |
| 7,780,072 B1 | 8/2010 | Lute et al. |
| 7,783,530 B2 | 8/2010 | Slemmer et al. |
| 7,806,248 B2 | 10/2010 | Hunter et al. |
| 7,854,310 B2 | 12/2010 | King et al. |
| 7,855,661 B2 | 12/2010 | Ponert |
| 7,933,841 B2 | 4/2011 | Schmeyer et al. |
| 8,138,950 B1 | 3/2012 | Leung |
| 8,395,532 B2 | 3/2013 | Chauvin et al. |
| 8,479,909 B2 | 7/2013 | King et al. |
| 8,513,832 B2 | 8/2013 | Hunter et al. |
| 8,566,159 B2 | 10/2013 | King et al. |
| 8,590,687 B2 | 11/2013 | King et al. |
| 8,595,054 B2 | 11/2013 | King et al. |
| 8,684,158 B2 | 4/2014 | Jones et al. |
| 8,749,403 B2 | 6/2014 | King et al. |
| 8,862,494 B2 | 10/2014 | King et al. |
| 9,002,723 B2 | 4/2015 | King et al. |
| 9,047,712 B2 * | 6/2015 | King ..................... G07F 17/24 |
| 9,127,964 B2 | 9/2015 | Schwarz et al. |
| 9,391,474 B2 | 7/2016 | Hunter et al. |
| 9,424,691 B2 | 8/2016 | King et al. |
| 9,685,027 B2 | 6/2017 | King et al. |
| 9,692,256 B2 | 6/2017 | Hunter et al. |
| 9,728,085 B2 | 8/2017 | Schwarz et al. |
| 10,089,814 B2 | 10/2018 | King et al. |
| 10,366,546 B2 | 7/2019 | King et al. |
| 10,423,980 B2 | 9/2019 | King et al. |
| 2001/0012241 A1 | 8/2001 | Dee et al. |
| 2001/0047278 A1 | 11/2001 | Brookner et al. |
| 2001/0051531 A1 | 12/2001 | Singhal et al. |
| 2002/0008639 A1 | 1/2002 | Dee |
| 2002/0063035 A1 | 5/2002 | Blad et al. |
| 2002/0109610 A1 | 8/2002 | Katz |
| 2002/0111768 A1 | 8/2002 | Ghorayeb et al. |
| 2003/0092387 A1 | 5/2003 | Hjelmvik |
| 2003/0112151 A1 | 6/2003 | Chauvin et al. |
| 2003/0112597 A1 | 6/2003 | Smith |
| 2003/0121754 A1 | 7/2003 | King |
| 2003/0128010 A1 | 7/2003 | Hsu |
| 2003/0128136 A1 | 7/2003 | Spier et al. |
| 2003/0140531 A1 | 7/2003 | Pippins |
| 2003/0144972 A1 | 7/2003 | Cordery et al. |
| 2003/0169183 A1 | 9/2003 | Korepanov et al. |
| 2003/0179107 A1 | 9/2003 | Kibria et al. |
| 2003/0220835 A1 | 11/2003 | Barnes et al. |
| 2003/0222792 A1 | 12/2003 | Berman et al. |
| 2004/0068434 A1 | 4/2004 | Kanekon |
| 2004/0084278 A1 | 5/2004 | Harris et al. |
| 2004/0094619 A1 | 5/2004 | Silberberg |
| 2004/0181496 A1 | 9/2004 | Odinotski et al. |
| 2004/0254840 A1 | 12/2004 | Slemmer et al. |
| 2004/0264302 A1 | 12/2004 | Ward |
| 2005/0040951 A1 | 2/2005 | Zalewski et al. |
| 2005/0178639 A1 | 8/2005 | Brumfield et al. |
| 2005/0192911 A1 | 9/2005 | Mattern |
| 2005/0216354 A1 | 9/2005 | Bam et al. |
| 2005/0226201 A1 | 10/2005 | Mcmillin et al. |

(56) References Cited

U.S. PATENT DOCUMENTS

| | | |
|---|---|---|
| 2006/0021848 A1 | 2/2006 | Smith |
| 2006/0116972 A1 | 6/2006 | Wong |
| 2006/0136131 A1 | 6/2006 | Dugan et al. |
| 2006/0149684 A1 | 7/2006 | Matsuura et al. |
| 2006/0152349 A1 | 7/2006 | Ratnakar |
| 2006/0267799 A1 | 11/2006 | Mendelson |
| 2007/0016539 A1 | 1/2007 | Groft et al. |
| 2007/0040449 A1 | 2/2007 | Spurlin et al. |
| 2007/0094153 A1 | 4/2007 | Ferraro |
| 2007/0114849 A1 | 5/2007 | Falik et al. |
| 2007/0119682 A1 | 5/2007 | Banks et al. |
| 2007/0136128 A1 | 6/2007 | Janacek et al. |
| 2007/0184852 A1 | 8/2007 | Johnson et al. |
| 2007/0210935 A1 | 9/2007 | Yost et al. |
| 2007/0285281 A1 | 12/2007 | Welch |
| 2008/0042836 A1* | 2/2008 | Christopher ........... G06Q 10/08 340/568.1 |
| 2008/0052254 A1 | 2/2008 | Al et al. |
| 2008/0071611 A1 | 3/2008 | Lovett |
| 2008/0093454 A1 | 4/2008 | Yamazaki et al. |
| 2008/0147268 A1 | 6/2008 | Fuller |
| 2008/0208680 A1 | 8/2008 | Cho |
| 2008/0238715 A1 | 10/2008 | Cheng et al. |
| 2009/0109062 A1 | 4/2009 | An |
| 2009/0192950 A1 | 7/2009 | King et al. |
| 2009/0267732 A1 | 10/2009 | Chauvin et al. |
| 2009/0284907 A1 | 11/2009 | Regimbal et al. |
| 2009/0315720 A1 | 12/2009 | Clement et al. |
| 2010/0106517 A1 | 4/2010 | Kociubinski et al. |
| 2010/0188932 A1 | 7/2010 | Hanks et al. |
| 2011/0313822 A1 | 12/2011 | Burdick |
| 2012/0222935 A1 | 9/2012 | Mackay et al. |
| 2012/0285790 A1 | 11/2012 | Jones et al. |
| 2012/0285792 A1 | 11/2012 | Jones et al. |
| 2012/0292385 A1 | 11/2012 | Mackay et al. |
| 2013/0005445 A1 | 1/2013 | Walker et al. |
| 2013/0027218 A1 | 1/2013 | Schwarz et al. |
| 2014/0108107 A1 | 4/2014 | Jones et al. |
| 2014/0174881 A1 | 6/2014 | King et al. |
| 2014/0289025 A1 | 9/2014 | King et al. |
| 2015/0106172 A1 | 4/2015 | Salama |
| 2016/0012418 A1 | 1/2016 | Mackay et al. |
| 2018/0082488 A1 | 3/2018 | King et al. |
| 2018/0082489 A1 | 3/2018 | King et al. |
| 2018/0082490 A1 | 3/2018 | King et al. |
| 2018/0350185 A1 | 12/2018 | King et al. |
| 2019/0272680 A1 | 9/2019 | King et al. |
| 2019/0272681 A1 | 9/2019 | King et al. |
| 2019/0304203 A1 | 10/2019 | King et al. |
| 2021/0319485 A1 | 10/2021 | King et al. |

FOREIGN PATENT DOCUMENTS

| | | | |
|---|---|---|---|
| EP | 0329129 A2 | 8/1989 | |
| EP | 0980055 B1 | 9/2001 | |
| EP | 1217778 A1 * | 6/2002 | ........... H04L 1/1614 |
| FR | 2837583 A1 | 9/2003 | |
| JP | 2002099640 A | 4/2002 | |
| JP | 2005267430 A | 9/2005 | |
| KR | 20050038077 A | 4/2005 | |
| WO | WO-03005324 A1 | 1/2003 | |
| WO | WO-2005031494 A2 | 4/2005 | |
| WO | WO-2006095352 A2 | 9/2006 | |
| WO | WO-2007063530 A2 | 6/2007 | |
| WO | WO-2009154787 A2 | 12/2009 | |

OTHER PUBLICATIONS

Cell Net Data Systems. First Wireless Monitoring of Parking Meters Results in Theft Arrests Using CellNet Data Systems Technology. PRNewswire (May 11, 1999) (2 pgs.).

Fidelman. Time's Running Out for Parking Meters at Present Locations: $270,000 Cited as Replacement Cost. City Employees Who Ticket Motorists Find Electronic Meters Unsuitable. The Gazette, Final Edition, Montreal, Quebec, Canada, Nov. 12, 2002, p. A7.

Flatley. In San Francisco, Hackers Park for Free. Read filed under Misc. Gadgets, downloaded from www.engadget.com website on May 3, 2010. Originally posted on Jul. 31, 2009 (5 pgs.).

Howland. How M2M Maximizes Denver's Revenue. Field TechnologiesOnline.com, Oct. 2011, pp. 9-12 [online] [retrieved Mar. 5, 2013], Retrieved from http://www.fieldtechnologiesonline.com/doc.mvc/How-M2M-Maximizes-Denvers-Revenue-0001 (4 pgs).

Meter Solutions, Single-Space Meters brochure, downloaded from www.duncansolutions.com website. (revised Apr. 2006) (2 pgs.).

PCT/IB2006/054574 International Preliminary Report on Patentability dated Mar. 10, 2009.

PCT/IB2006/054574 International Search Report dated Oct. 27, 2008.

PCT/US2010/047906 International Preliminary Report on Patentability dated Mar. 6, 2012.

PCT/US2010/047906 International Search Report dated Mar. 30, 2011.

PCT/US2010/047907 International Preliminary Report on Patentability dated Mar. 15, 2012.

PCT/US2010/047907 International Search Report dated Apr. 26, 2011.

PCT/US2012/048190 International Search Report dated Jan. 22, 2013.

Spyker et al. Predicting Capacitor Run Time For a Battery/Capacitor Hybrid Source. Power Electronic Drives and Energy Systems for Industrial Growth. 1998. Proceedings. 1998 IEEE International Conference, pp. 809-814.

Tung. Design of an advanced on-street parking meter. RIT Scholar Works. Thesis/Dissertation Collections (75 pgs.) (2001).

* cited by examiner

METHOD AND APPARATUS FOR AUTOMATIC LOCATION-SPECIFIC CONFIGURATION MANAGEMENT OF A REMOVABLE METER UNIT

CROSS-REFERENCES TO RELATED APPLICATIONS

This application is a continuation of U.S. application Ser. No. 16/442,270, filed Jun. 14, 2019, which is a continuation of U.S. application Ser. No. 14/558,564, filed on Dec. 2, 2014, now issued as U.S. Pat. No. 10,366,546 issued on Jul. 30, 2019, which is a division of U.S. application Ser. No. 12/355,740, filed Jan. 16, 2009, now issued as U.S. Pat. No. 9,002,723 issued on Apr. 7, 2015, which claims the benefit of U.S. Provisional Patent Application No. 61/022,208, filed Jan. 18, 2008, entitled "A PARKING METER" and claims the benefit of U.S. Provisional Application No. 61/022,213, filed Jan. 18, 2008, entitled "THE OPERATION OF PARKING METERS," each of which are incorporated herein by reference in their entirety for all purposes.

BACKGROUND

Field of the Invention

The invention relates generally to electronic communications for reporting, and more particularly, but not by way of limitation, to location-specific transaction reporting for vehicle parking.

Description of the Related Art

A "meter" can be any of various devices configured to measure time, distance, speed, or intensity, or to indicate, record, and/or regulate an amount or volume, such as, for example, the flow of a gas or an electric current. As technology has advanced, meters have also become more advanced. Meters that measure the passage of time, e.g., parking meters, typically include timer mechanisms similar to those of mechanical watches. Since these timer mechanisms had limited life spans, the parking meters were constructed with a fixed housing that was configured to receive a replaceable meter unit including the meter timer mechanism. When the timer mechanism wore out, the meter unit could be replaced. Other types of meters that can have replaceable meter units include water meters and gas meters that measure the flow of material, such as water or gas, respectively.

Many mechanical meters have been replaced by digital-based meters. Digital meter units can have longer life spans than their mechanical predecessors, but they still are replaced when they malfunction, are damaged, or even when the technology changes.

With advances in communications, e.g., wireless telecommunications, it is possible to monitor many meters remotely. For example, a group of meters can report information to a central data manager using wireless communications. The information reported can be related to financial transactions such as credit card information or periodic measures such as the amount of gas or water consumed. Meters that communicate local information are often associated with a specific geographic location. For example, a meter might be associated with locations such as a parking spot, a house, a ticket booth, a cash register, a vending machine, and so forth. The central data manager can maintain a database that associates each meter with corresponding meter information such as transactions or consumption measures.

The central data manager that receives reporting information from a local meter needs to know what meter is associated with the received reporting information. The reporting information can be associated with the proper meter by determining an identifier of the meter, such as a meter unit serial number or ID. When a meter unit is replaced, the central data manager needs to update its reporting information for the old meter with the unit ID of the new meter unit. Replacement of meter units is a relatively regular occurrence, as meter units fail or require periodic maintenance or become damaged.

Updating of meter information in the database upon meter unit replacement has typically been performed manually by entering the new meter unit ID into the database of the central data manager and manually associating the new meter unit ID with the reporting information and disassociating the old meter unit ID with the reporting information. In addition, during operation a meter unit may need to be configured with various operational parameters that determine rates and parking rules for the meter location. This operational configuring has also typically been performed manually, often on the meter unit itself. Manual data entry and configuring of the meter reduces efficiency by increasing the time to update and reduces reliability by potentially increasing the number of errors in the central data manager database and in the configuration information of the meter.

From the discussion above, it should be apparent that there is a need for more efficient and reliable updating of location-specific meter information to a data manager. The present invention satisfies this need.

SUMMARY

A meter apparatus includes a tag associated with unique tag identification information and configured to be permanently affixed to a location housing at a physical location, and a removable meter unit configured to mate to the location housing and receive the tag identification from the tag and report the tag identification to a data manager that is configured to associate an identifier of the removable meter unit with the reported tag identification and unique physical location and to associate configuration information for the physical location with the removable meter unit and the reported tag identification. In this way, meter information at a specific location can be automatically updated and reported to a data manager with increased efficiency and reliability.

The meter apparatus can include a memory module to store information regarding a transaction history. The tag is configured to provide its unique identification information to the removable meter unit, and thereby provide its unique physical location as well. The memory module can be configured to store information indicative of a transaction history for the meter apparatus, including a payment collection history. The memory module can be incorporated with the tag. A removable meter unit that is mated with the housing can receive the identification information from the tag. With the tag identification information, the meter unit can determine its physical location and configuration information, including operating parameters and transaction history for the physical location. Such parameters and information can be determined by the meter unit directly from the tag or from a data manager upon providing the tag identification information.

Another meter apparatus includes a removable meter unit that receives a tag identification associated with a unique physical location and reports the tag identification to a data manager such that the data manager associates an identifier of the removable meter unit with the physical location and the tag identification, and associates operating parameters for the physical location with the removable meter unit and the tag identification. The tag identification is received from a tag associated with the physical location, where the tag is permanently attached to a location housing that is fixedly placed at the physical location and that is configured to mate with the removable meter unit.

A method of operating a meter includes receiving a tag identification associated with a unique physical location at which a removable meter unit is placed, determining configuration information associated with the tag identification and the physical location, and associating the determined configuration information with the removable meter unit. The tag identification is received from a tag associated with the physical location, and wherein the tag is permanently attached to a location housing that is fixedly placed at the physical location and the location housing is configured to mate with the removable meter unit.

In other aspects, the tag is configured to receive information indicative of removal of a cash collection box containing currency received at the removable meter unit. Upon receiving the information indicative of the removal of the cash collection box, the tag can be configured to initiate storing transaction information in the memory module. The transaction information can include data indicating the amount of currency collected at the removable meter unit based on the stored payment collection history. In addition, the tag can be further configured to reset the transaction history stored in the memory module in response to receiving the information indicative of the removal of the cash collection box.

In yet another embodiment, a parking meter includes a meter unit; a cash collection box; and a tag device for monitoring the content of the cash collection box. The tag device may have a unique tag identifier, which is associated with the parking meter. The tag identifier may be associated with a unique location of the parking meter, such that the cash collected at each unique location may be monitored during use, irrespective of the particular meter unit or cash collection box used, from time-to-time at each unique location.

The tag device may have a memory module in which the value of coins in the cash collection box of the parking meter in question is recorded during use. The memory module may be of the non-volatile type and the value may be externally readable. The value may also be reset externally. Conveniently the memory module may record a total value collected and an interim value.

In another aspect, the parking meter may have a housing, with the tag device being secured thereto or therein. The meter unit may communicate with the tag device, to receive tag device information and to record therein the number and/or value of coins received by the meter unit. This may be effected by means of a wired, radio, or optical link between the meter unit and tag device. The tag device may comprise a small microprocessor with nonvolatile flash memory, such as a wired memory device, or can comprise an RFID tag or the like.

As described further herein, cash collected at each meter location may be monitored and recorded, otherwise than by the meter unit, such that a defective meter unit may be removed and replaced with another, without replacing the cash collection box and without affecting monitoring of the cash collected at that location.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The invention is described, by way of non-limiting examples, with reference to the accompanying drawings, in which.

Figure 1A:
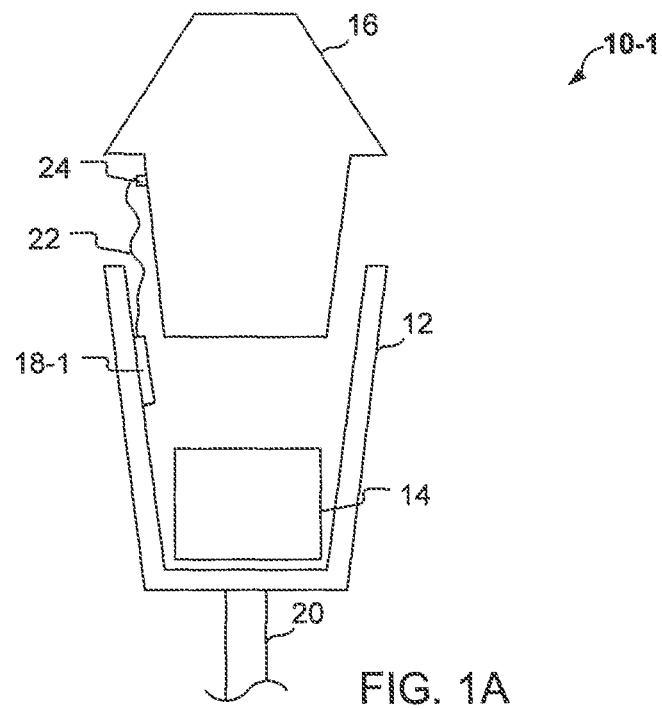
FIGS. 1A and 1B illustrate embodiments of single-space parking meters constructed in accordance with the invention.

In the appended figures, similar components and/or features may have the same reference label. Further, various components of the same type may be distinguished by following the reference label (e.g., "18") by a dash and a second label that distinguishes among the similar components (e.g., "18-1" and "18-2"). If only the first reference label is used in the specification, the description is applicable to any one of the similar components having the same first reference label irrespective of the second reference label.

DETAILED DESCRIPTION

In one embodiment of a meter apparatus as described herein, the meter apparatus includes a housing that is fixedly placed at a unique physical location and is configured to permanently receive a tag. The tag is associated with the unique physical location. The location housing is configured to mate with a removable meter unit. The meter apparatus includes a memory module to store information regarding a transaction history for the physical location. The tag is configured to provide its unique identification information to the removable meter unit, and thereby provide the meter unit with its unique physical location as well. The memory module can be configured to store information indicative of a transaction history for the meter apparatus. A meter unit that is mated with the housing can receive the identification information from the tag. With the tag identification information, the meter unit can determine its physical location and configuration information, including operating parameters and transaction history for the physical location. During operation, the meter unit can continue to receive updated operating parameters and, if desired, can report its configuration information such as operational status in accordance with its tag identification information.

In another embodiment, the meter apparatus comprises a parking meter associated with a unique parking location, and a method of operating a parking meter includes transmitting radio signals to, and receiving radio signals from, a data manager.

The parking meter may be a single-space parking meter, comprising a parking meter that is associated with a single parking space that accommodates one vehicle.

A transceiver of the parking meter may be constructed from conventional equipment, which typically has a maximum range of up to 150 meters, but should preferably be capable of operation at less than 80 meters. The transceiver may communicate with a data manager that maintains a database with parking meter information stored according to the tag identification information.

It will thus be appreciated that one construction of a parking system may comprise a predetermined number of single-space parking meters that, together with an associated local data manager, form a local group, and the local data manager can communicate with a central data manager.

Yet another embodiment provides a vehicle parking control system that includes a number of parking meters in accordance with the invention that are grouped together; an associated local data manager which has a complementary transceiver for receiving radio transmissions from the grouped parking meters and a transmitter for transmitting signals to the grouped parking meters and a communication facility for communicating with a central data manager, the grouped parking meters and the associated local hub manager forming a local group.

The system may thus include a number of local groups and a central data manager.

It will be appreciated that the local data manager will typically be located no more than about 150 meters and preferably not more than about 80 meters from any of its associated group of parking meters.

The transceivers may operate in the 2.4 GHz frequency band and may have a power of between 1.0 mW and 6.0 mW.

The communication facility of the local data manager may communicate with the central data manager by means of a data channel, which may use a variety of networks, such as a cellular telephone network, a wireless LAN, a wired LAN, a mesh network or the Internet.

Communications between the parking meters and the central data manager may be in regard to payment authorization, status reports, fault reporting and/or configuration and software updates.

It will be appreciated by those skilled in the art that the local data managers may concentrate data received from their parking meters before communicating with the central data manger; synchronized time division multiplexing may be used to keep active transmit and receive times short; data may be encrypted; and messages may be acknowledged to improve reliable delivery.

Each group of parking meters and its associated local data manager may be in the form of a mesh radio network, such that certain parking meters may act as relays for other parking meters that don't have direct communication with the local data manager Referring to FIG. 1A, an embodiment of a meter apparatus for a single parking space is designated generally by reference numeral 10-1. That is, the meter apparatus 10-1 comprises a single-space parking meter. The parking meter 10-1 includes a location housing 12, a cash collection box 14, a meter unit 16, and an auxiliary device 18-1 in the form of a tag. The location housing 12 is fixedly attached to a pole 20 that is in relatively close proximity to the parking space (not illustrated in FIG. 1A), so that the meter 10-1 is readily associated and identified with the parking space. The cash collection box 14, the meter unit 16, and the tag 18-1 are received in the location housing 12.

The tag 18-1 is attached to an inner surface of the housing 12, whereas the cash collection box 14 and meter unit 16 are removable and replaceable. In the example shown in FIG. 1A, the tag 18-1 is connectable to the meter unit 16 by means of a length of wire 22 and a plug-in connector 24, and can be powered by the meter unit 16 (e.g., by a battery, solar cell, or other power source associated with the meter unit 16). The tag device 18-1 may comprise a small microprocessor with nonvolatile flash memory, such as the 1-wire memory device product called "DS2433" of Dallas Semiconductor from Maxim Integrated Products, Inc. of Sunnyvale, CA, USA.

Figure 1B:
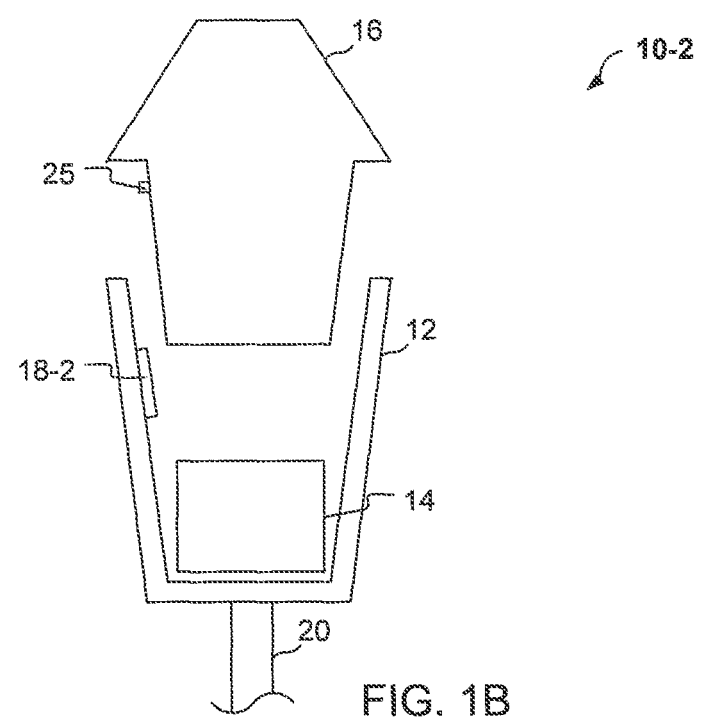

Referring to FIG. 1B, another embodiment of a single-space parking meter is designated generally by reference numeral 10-2. The parking meter 10-2 is similar to the parking meter 10-1 of FIG. 1A except that the FIG. 1B parking meter 10-2 includes a wireless tag 18-2 and the meter unit 16-2 includes a wireless transceiver 25. The wireless tag and the meter unit are capable of communication with each other over a wireless communication channel. The wireless tag 18-2 can be, for example, an RFID tag, a smart card that is powered by the wireless transceiver 25, or an ID token, or the like. The wireless transceiver 25 receives information from the tag 18-2 and, for example, can be a radio transceiver that uses Wi-Fi, Bluetooth, WiMAX, or other short-range wireless radio technology, in accordance with the wireless communication channel used by the tag.

In some embodiments, such as, for example, where the tag 18-2 is an RFID and/or a smart card, the wireless tag 18-2 is powered by the signal transmitted by the transceiver 25. In other embodiments, the wireless tag 18-2 can be powered by a battery. Because the distance from the wireless transceiver 25 to the tag 18-2 is relatively small, the power consumed by the wireless transceiver 25 and/or the tag 18-2 can be very low, such that a relatively small capacity battery that is compact provides sufficient power.

The wireless transceiver 25 of the parking meter 10-2 could be an Infrared (IR) transceiver. In that case, the transceiver 25 is aligned with the tag 18-2 such that the infrared beam of the transceiver is properly targeted at the tag 18-2.

In one embodiment, the wired tag 18-1 or the wireless tag 18-2 is used to monitor the content of the cash collection box 14, as will be explained below. Also as explained below, each tag 18 has a unique identifier that identifies the parking meter 10 with which it is used and which is associated with a unique physical location where the parking meter is fixedly located, e.g., the location of the pole 20 and the location housing 12.

In many situations, the parking location associated with the meter 10 is a public parking space administered by a municipal government, and the cash collection box 14 and the meter unit 16 are typically serviced by independent entities. For example, the meter unit 16 can be removed and replaced, e.g., due to upgrades, defective equipment and the like, by a provider that is contracted by the municipality to keep the parking meters 10 functioning properly. On the other hand, removal of the cash collection box 14 and emptying the currency within it are typically performed by a municipal employee. The removal and replacement of the cash collection box 14 independently of the meter unit 16 can make monitoring of both the cash collection box 14 and the removable meter unit 16 difficult.

Some embodiments of the tag units 18 and the removable meter units 16, when used with the systems and methods discussed below, can enable robust and accurate monitoring of currency collected at a specific location even if meter unit 16 removal and cash collection box 14 removal and emptying operations are independently performed. Other embodiments can enable automated updating of configuration information such as operating parameters when the removable meter unit is replaced and/or when configuration information for the specific location are updated. For example, upon replacement of an old meter unit in a meter housing, a new meter unit can automatically receive tag identification information from a tag of the meter housing and can contact a data manager to report its new location (i.e., its associated tag ID) and to receive configuration information that includes operating parameters. Similarly, removal and/or emptying of a meter cash box can automatically initiate contact from the meter unit to a data manager to report its tag ID and the cash box activity, as well as receive configuration information. This feature is described further below. Some embodiments of the tag units 18 and the removable meter units 16 can be configured to receive configuration information such as operating parameters on demand from the data manager. The operating parameters can include any settings that effect the operation of the removable meter unit, including data such as a parking rate, a geographic location, parking rules for operation, an amount of currency in a cash box, and times when parking rates or rules apply, and the like.

In FIG. 1A and FIG. 1B, the location housing 12 is configured to permanently receive the tag 18. The location housing 12 being configured to permanently receive the tag 18 means that the tag is affixed to the location housing such that the tag cannot be removed without leaving clear physical evidence of its removal from the location housing 12, and/or such that removal makes the tag 18 inoperable. The tag 18 can be permanently affixed with an adhesive glue, double sided tape, single sided tape, soldering, and similar techniques that will be known to those skilled in the art.

The embodiment of the location housing 12 in FIGS. 1A and 1B is a clam-shell type of housing that is affixed to the pole 20 and is configured to mate with a removable meter unit 18. In other embodiments, however, the location housing 12 can be a cabinet or other enclosed space that is configured to mate with one or more removable meter units, where the removable meter units are configured to be mated in compartments of the cabinet, and each of the compartments is associated with a physical location that is not necessarily at the same location as the cabinet or the compartment. In other embodiments, the location housing can be another type of receptacle fixedly placed and associated with a physical location.

Figure 2A:
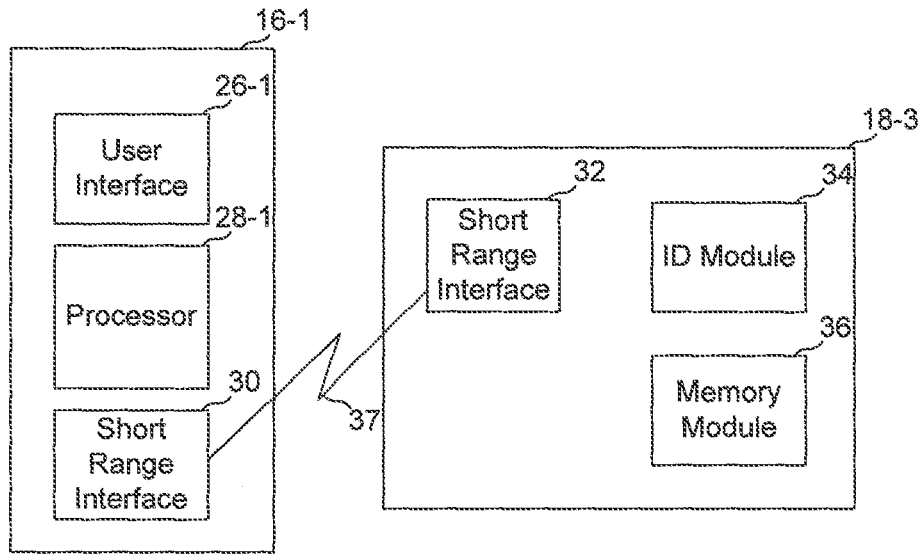
FIGS. 2A and 2B show schematically a removable meter unit and an auxiliary device as used in the parking meter of FIGS. 1A and 1B.

Referring to FIG. 2A, functional block diagrams of examples of an exemplary removable meter unit 16-1 and a tag 18-3 are shown. The meter unit 16-1 includes a user interface 26-1 through which payment can be received. The meter unit 16-1 also includes electronic components including a processor module 28-1 and a short range interface 30 by means of which the meter unit communicates with the tag 18-3. The tag 18-3 has a short range interface 32, an ID module 34, and a memory module 36 for storing information regarding configuration information including a payment collection history and/or operating parameters and meter settings. The meter unit 16-1 is linked to the tag 18-3 by a communications link 37. In the case where the tag 18-3 is a wired tag 18-1, the link 37 comprises a wire connecting the two, such as the wire 22 illustrated in FIG. 1A. In the case where the tag 18-3 is a wireless tag 18-2, the link 37 can comprise a radio link or an optical link. In the case of a wireless tag 18-2, the short range interfaces 30 and 32 between the meter unit and tag, respectively, can comprise RFID devices, Bluetooth devices, Wi-Fi devices, IR devices, smart card devices, and the like.

The processor module 28-1 includes one or more processors such as application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and/or a combination thereof. The processor module 28-1 also includes one or more storage mediums. A storage medium can include one or more memories for storing data, including read only memory (ROM), random access memory (RAM), magnetic RAM, core memory, magnetic disk storage mediums, optical storage mediums, flash memory devices and/or other machine readable mediums for storing information.

The user interface 26-1 provides a means for a user to interact with the meter unit 16-1 and can include, for example, a display and keypad. The user interface 26-1 can provide a payment interface including a currency receiver for receiving coins and or bills in payment for using the parking location. The processor module 28-1 obtains payment information from the payment interface that provides transaction information regarding the amount of a payment received at the payment interface 26-1. The processor module 28-1 communicates the transaction information, via the link 37, to the short range interface 32 of the tag 18-3. The short range interface 32 then updates the memory module 36 based on the received transaction information. The memory module 36 can add the amount of currency indicated to have been received by the transaction information to the stored amount. In addition, the memory module 36 can also receive and store transaction-time information including the date and time of day that the payment was received. In this way, when coins or bills are inserted into the meter unit 16-1 and are collected in the cash collection box 14, the value of the coins and/or bills is determined by the meter unit 16-1 and the value stored in the memory module 36 of the tag 18-3 is appropriately updated. Thus, the tag 18-3 records the value of cash collected in the cash collection box 14 and stores the value in the memory module 36. The memory module 36 can also store configuration information indicative of other operating parameters such as parking rate, geographic location, parking rules, an amount of currency in a cash box, and times when different parking rates or rules apply.

The ID module 34 stores a unique identifier, e.g., a tag identification or serial number, that is associated with the tag 18-3. Preferably, the unique identifier of the tag 18-3 and the value stored in the memory module 36 are externally readable, e.g., by a suitable reader (not shown) via the interface 32. For example, if the short range interface 32 is an RFID module, then the reader could be an RFID reader. Other types of readers that can be used depend on the embodiment, but can include IR readers, smart card readers (contact or non-contact), plug in readers, and the like. In this way, periodic downloading of the value stored in the memory module 36 can be performed with an appropriate reader to monitor the amount of cash that should be contained in the cash collection box. This downloaded cash value can then be used to detect a theft of cash, if the expected downloaded cash value does not match the collected amount of cash.

In one embodiment, the transaction information stored in the memory module 36 can be reset to zero when the cash collection box 14 is emptied or replaced. As noted above, the cash collection box 14 and meter unit 16 may be independently serviced. That is, they can be independently removed and replaced from the meter 10. In one aspect of this embodiment, the removable meter unit 16 automatically detects when the cash collection box 14 is removed. This can be accomplished using a sensor such as a motion sensor, an IR sensor, a magnetic field sensor, or the like.

In the case of a wireless tag such as illustrated in FIG. 2A, reset to zero occurs when the removable meter unit 16-1 detects that the cash collection box 14 is removed, in which case the short range interface 30 of the removable meter unit 16-1 communicates a signal to the short range interface 32 of the tag 18-3. In response to the signal indicating removal of the cash collection box 14, the short range interface 32 of the tag 18-3 resets the payment collection history stored in the memory module 36 to indicate no collection history (i.e., reset to zero) and, preferably, stores the total amount of currency collected since the last cash collection box removal in the memory 36. In another aspect of this embodiment, the tag 18-3 is configured to detect the removal of the cash storage box 14 and autonomously reset the payment history and store the total amount of currency collected into the memory 36.

In another embodiment, when the cash collection box 14 is removed, an electrical circuit between the cash collection box 14 and the tag 18-3 is broken, thereby allowing the tag 18-3 to detect the removal of the cash collection box 14. In yet another embodiment, the person removing the cash collection box is required to perform an action that provides an external signal, e.g., insert a key, a magnetic stripe card, token, or smart card into the removable meter unit, thereby providing a signal that alerts the removable meter unit that the cash collection box is being removed.

Figure 2B:
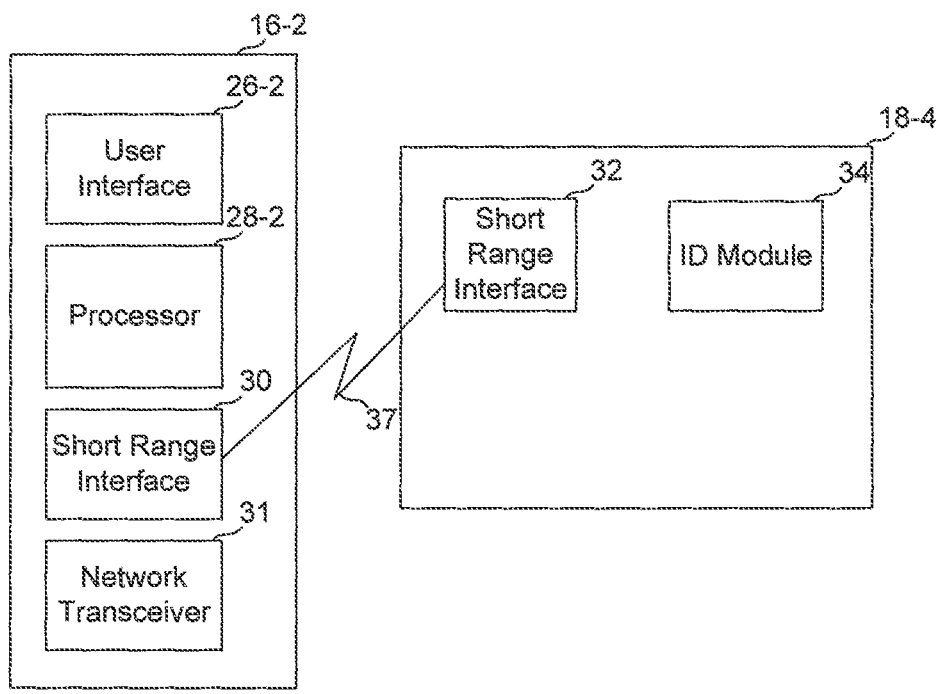

Referring to FIG. 2B, functional block diagrams of other embodiments of a meter unit 16-2 and a tag 18-4 are shown. In the embodiments shown in FIG. 2B, the meter unit 16-2 includes a user interface 26-2, a processor module 28-2, the short range interface 30, and a network transceiver 31. The short range interface 30 can be the same as that in the removable meter unit 16-1 of FIG. 2A. That is, the short range interface 30 of FIG. 2B is the means by which the meter unit 16-2 communicates with the tag 18-4. The network transceiver 31 can be configured to communicate to and from wired or wireless networks. Wired networks include LANs, WANs, MANs, the Internet, intranets, and the like. Wireless networks include cellular telephone networks, Wi-Fi networks, WiMAX networks, and the like. Cellular telephone networks can be any of various technologies such as CDMA, GSM, TDMA, or the like.

The user interface 26-2 includes similar components as the user interface 26-1 of the removable meter unit 16-1 shown in FIG. 2A. In addition, the user interface 26-2 preferably includes a credit/debit card reader. The credit/debit card reader allows for the use of magnetic stripe cards and/or smart cards, tokens, and the like to be used for payment of the parking fees instead of, or in addition to, currency payments such as coins and or bills. The credit card transaction information and authorization is communicated via the network transceiver 31 to a remote transaction authorization facility, per conventional practice known to those skilled in the art.

The processor module 28-2 of the removable meter unit 16-2 shown in FIG. 2B is similar to the processor module 28-1 of the removable meter unit 16-1, but is coupled to the network transceiver 31 in order to communicate payment information to a remote data manager. The data manager is not illustrated in FIG. 2B; details of the data manager and the data communicated with the data manger are discussed further below.

Because the removable meter unit 16-2 of FIG. 2B is capable of communicating payment information to the remote data manager via the network transceiver 31, the tag 18-4 does not include a memory module 36 as in the tag 18-3 shown in FIG. 2A. When currency and/or a credit/debit card payment are received at the removable meter unit 16-2, the payment information is communicated to the remote data manager. In order for the remote data manager to be able to know at which location the payment is being received, the tag ID information stored in the ID module 34 is communicated to the remote data manager. That is, rather than store configuration information, including transaction information such as payment history, with the memory module of the tag, the FIG. 2B embodiment maintains such information at the data manager. Details of methods used to communicate between the data manager and the removable meter unit are discussed below in connection with FIG. 3.

When the removable meter unit 16-2 of FIG. 2B is first installed in the location housing 12 that contains the tag 18-4, the short range interface 30 of the removable meter unit 16-2 communicates with the short range interface 32 of the tag 18-4 and reads/receives the tag ID that is stored in the ID module 34. The tag ID and a removable meter unit ID are then communicated via the network transceiver 31 to the remote data manager. The remote data manager is coupled to a database containing unique physical locations and the tag IDs that are associated with the unique locations. The remote data manager then associates the ID of the removable meter unit 16-2 with the tag ID and with the unique physical location. In addition, any previous payment collection history that was associated with the tag ID and unique physical location is associated with the newly installed removable meter unit 16-2 and disassociated with the previous removable meter unit ID.

In addition to associating the payment collection history upon installation of a new removable meter unit, the remote data manager can also associate other configuration information such as operating parameters affecting the configuration of the meter. These operating parameters can include parking rate, geographic location, parking rules, amount of currency in a cash box, and times when different parking rates or rules apply. The operating parameters can be transmitted by the remote data manager to the removable meter unit thereby automatically updating the operating parameters of the removable meter unit. In addition to transmitting operating parameters upon installation of a new removable meter unit, a remote data manager can update the operating parameters automatically when they change.

In addition to communicating payment collection information transaction history to the data manager, the removable meter unit 16-2 can communicate an indication of removal of the cash collection box 14 to the remote data manager. In response to receiving the cash collection box removal indication, the remote data manager can reset the payment collection history in the database and record the amount of cash that was collected up to the removal event. In this way, the remote data manager can keep track of how much currency should have been collected and returned by the individual removing the cash collection box 14.

In one embodiment, the tag 18-4 includes a memory module 36 and the payment collection information can be stored in the memory module 36 to provide redundancy protection. In this way, if the network transceiver fails, the memory module 36 can store the payment collection history information. The redundant payment collection history information can be communicated to the data manager at a later date when the network transceiver 31 is replaced/repaired. In addition, the memory module 36 could store other configuration information such as operating parameters, including meter settings. In this way, a new removable meter unit could retrieve the configuration information from the tag 18-4 upon installation.

Figure 3:
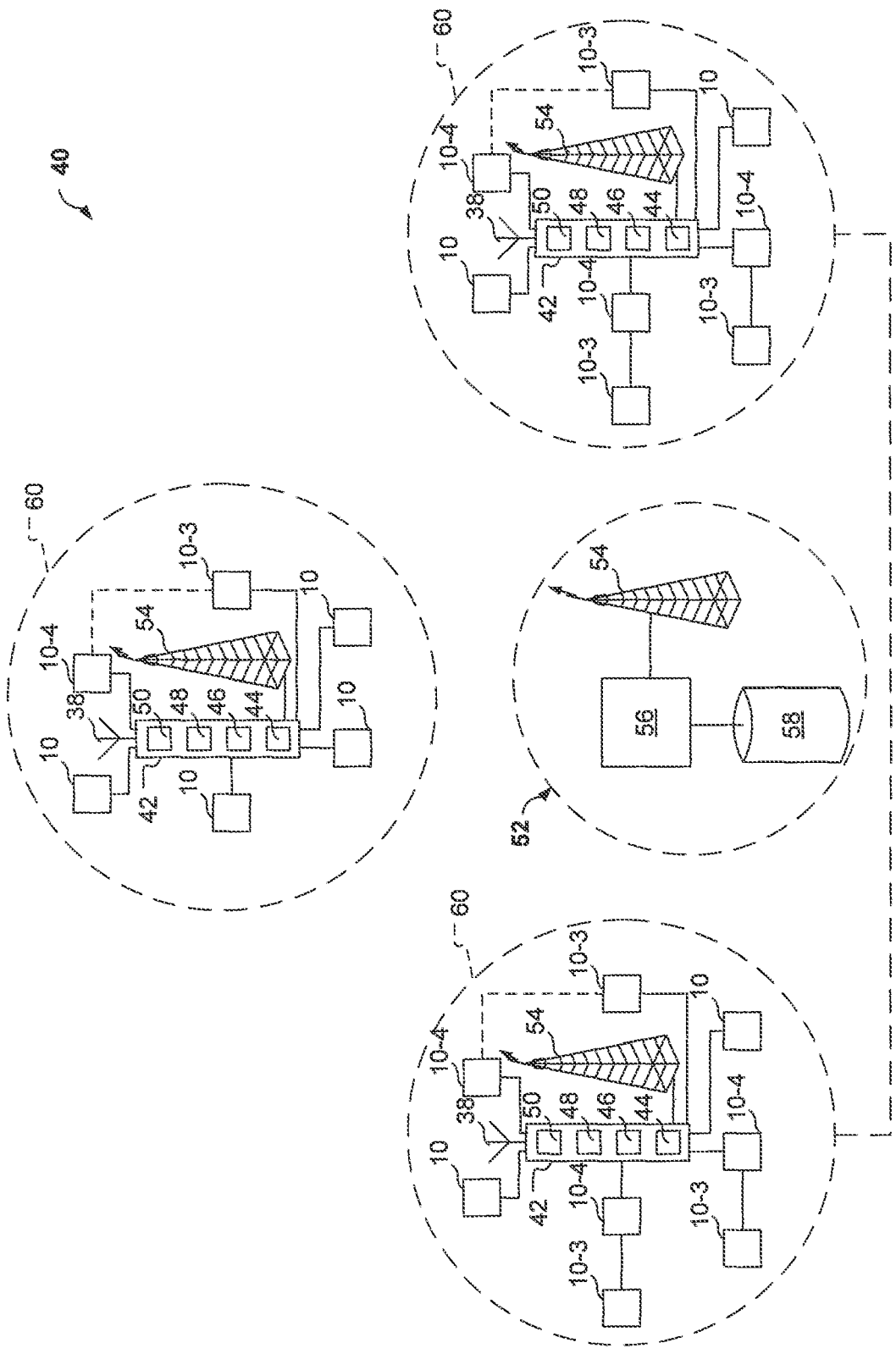
FIG. 3 shows schematically an embodiment of a parking meter system that monitors a number of the parking meters such as those of FIG. 1A and/or FIG. 1B.

Referring to FIG. 3, a parking meter system is designated generally by reference numeral 40. The system 40 utilizes a number of the parking meters 10. The parking meters 10 can be, for example, either of the parking meters 10-1 or 10-2 shown in FIGS. 1A and 1B, that include a removable meter unit 16-2 with the network transceiver 31. The parking meters 10 are operationally arranged into groups, with each group having a local data manager 42. That is, each group of parking meters 10 will report data to its associated local data manager 42 and will thereby form a local group 60. In one embodiment, there are about 30 parking meters in each local group 60. Not all the parking meters 10 are shown in the local groups 60 illustrated in FIG. 3.

Each of the local data managers 42 communicates with a central data manager 52. In the system 40 of FIG. 3, this is effected by means of a cellular telephone network, with each local data manager 42 and the central data manager 52 being connected to a base station 54 of the cellular telephone network. Data links are thereby established between the local data managers 42 and the central data manager 52. Although only three local groups 60 are shown, there can be more or fewer local groups 60.

Each local data manager 42 has a network data modem 44, a control device 46, a memory 48 and a radio transceiver 50 with an antenna 38. As indicated above, each local data manager 42 communicates with the parking meters 10 in its local group 60 via its transceiver 50 and the network transceiver 31 of the parking meter 10. The local data managers 42 may do so directly, or indirectly via another parking meter 10 as indicated with parking meters 10-3 and 10-4.

The memory 48 can include one or more memories for storing data, including read only memory (ROM), random access memory (RAM), magnetic RAM, core memory, magnetic disk storage mediums, optical storage mediums, flash memory devices, and/or other machine readable media for storing information. The memory 48 stores the configuration information including payment collection history information and/or operating parameters for the parking meters 10 in the local group 60. The payment collection history information stored in the memory 48 is communicated to the central data manager 52 via the modem 44, the base station 54 and any intervening networks such as, for example, the Internet.

The control device 46 comprises one or more processors coupled to the memory 48 and configured to control the functions associated with the radio transceiver 50 and the modem 44. The processor 50 can include one or more of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and/or a combination thereof.

Alternatively to communicating with a local data manager 42, other embodiments can provide the parking meter 10 with a network interface 31 that communicates with the central data manager 52. In these embodiments, the network interface 31 can comprise a cellular telephone transceiver, a MAN transceiver, a satellite transceiver, or other type of transceiver that communicates over a network to the central data manager 52.

The central data manager 52 has a controller 56 with a modem and a database store 58. It also has a communication module for communicating with financial institutions (not shown) to obtain authorization for credit or debit card payments and payment. The modem of the central data manager 52 can be any modem configured to communicate over a network such as the Internet. The data store 58 includes a database that stores tag ID's and associates the tag IDs with the unique physical locations and the removable meter unit IDs in order to store the operating parameters including the payment collection histories and configuration information as discussed above.

To accommodate most system configurations, the transceivers 31 of the removable meter units 16-2 and the transceivers 50 of the local data mangers 42 will have a power rating of about 1 mW and will have a range of about 80 meters. Thus, each local group 60 can extend over an area having a radius of about 80 meters.

In operation, if a person wishing to park at a parking meter wants to pay by means of a credit card, the relevant information is read by a card reader and transmitted to the central data manager 52 via the relevant local data manager 42. The central data manager 52 obtains authorization and communicates this back to the appropriate parking meter 10 via the relevant local data manager 42. Further, status reports, fault reporting and/or configuration and software updates, may be communicated between the parking meters 10, the local data manager 42 and/or the central data manager 52.

In one embodiment where the parking meter 10-3 communicates with one or more other intermediate parking meters 10-4, and the intermediate parking meter 10-4 communicates with the local data manger 42, the parking meters 10-3 and 10-4 communicate using a mesh network protocol. Those skilled in the art will know that mesh network protocols can be provided by several conventional communication protocols, including Bluetooth, Wi-Fi, and 802-15 (commonly referred to as WPAN for Wireless Personal Area Network, or ZigBee).

Figure 4:
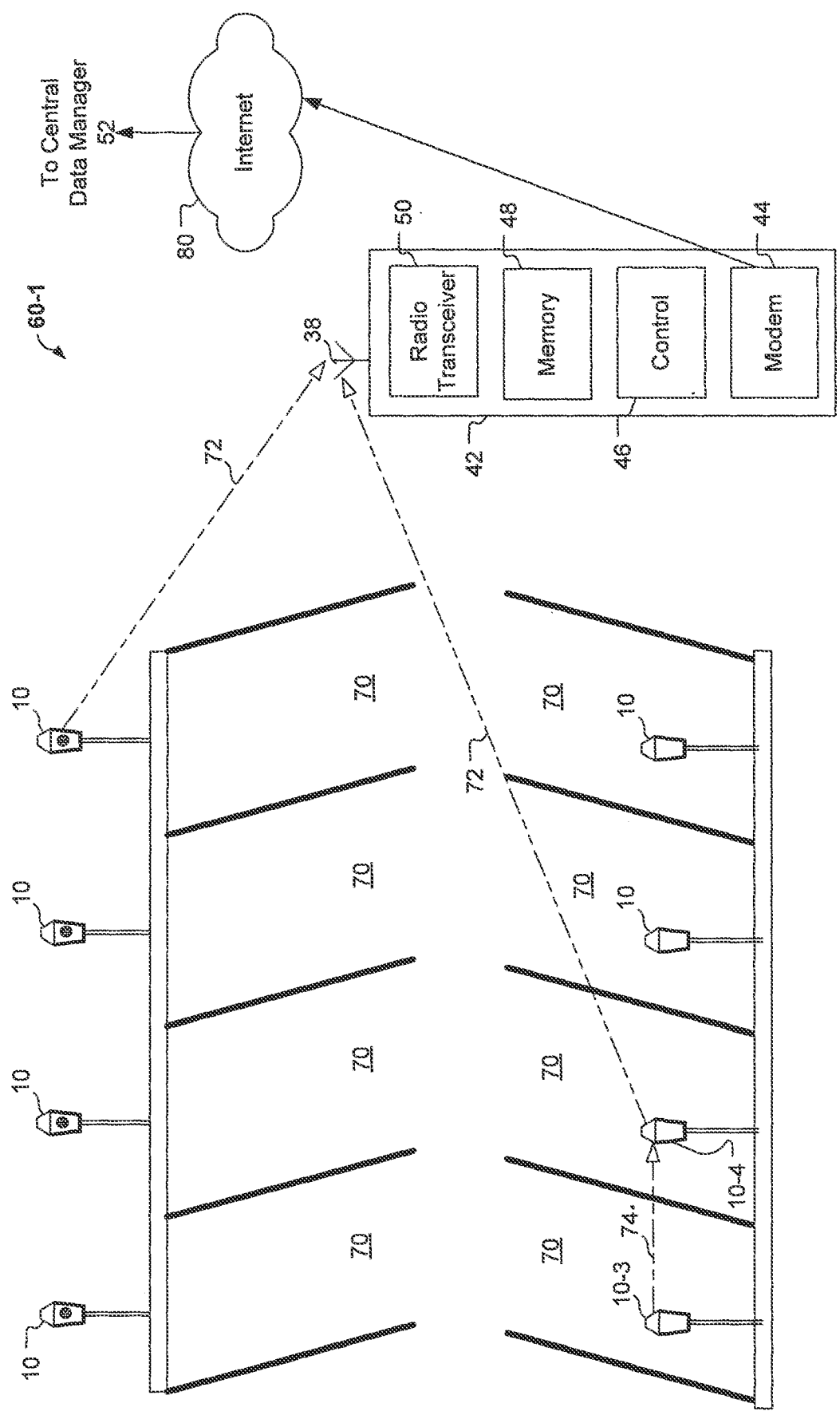
FIG. 4 shows schematically an example of a local group of parking meters that can be monitored by the parking meter system of FIG. 3.

Referring to FIG. 4, an example of a local group 60-1 of parking meters 10 that can be monitored by the parking meter system 40 of FIG. 3 is shown. The local group 60-1 includes eight parking meters 10, but other numbers of parking meters could be included in the local group 60-1. Each parking meter 10 is fixedly located at and associated with a parking spot 70. The parking spots 70 are angled parking spots that could be located in a parking lot or on a street, for example.

The parking meters 10 each include a removable meter unit 16, such as the removable meter unit 16-2 illustrated in FIG. 2B, that includes a network transceiver 31. The eight parking meters 10 communicate, via the network transceiver 31 with the antenna 38 and the radio transceiver 50 of the local data manager 42. The parking meters 10 can communicate directly with the local data manager 42, as illustrated by connections 72, or can communicate indirectly (e.g., using a mesh network) via one of the other parking meters 10, as illustrated by the connection 74 between parking meters 10-3 and 10-4. As discussed above, the removable meter units communicate information to the local data manager 42, the information including tag IDs, removable meter unit IDs, payment collection information including currency received and credit/debit card information. The removable meter units can also receive configuration information such as operating parameters from the local data manager 42 upon installation or when the operating parameters are updated.

In the embodiment shown in FIG. 4, the local data manager 42 uses the modem 44 to communicate with the central data manager 52 via the Internet 80. It should be understood that the "modem" refers to any device that provides a communication interface between the local data manager and the network. The information communicated to the central data manager 52 includes tag IDs, removable meter unit IDs, and payment collection information including currency received and credit/debit card information. The local data manager 42 can receive configuration information such as operating parameters from the central manger 52 and communicate these to the removable meter units 16.

Figure 5:
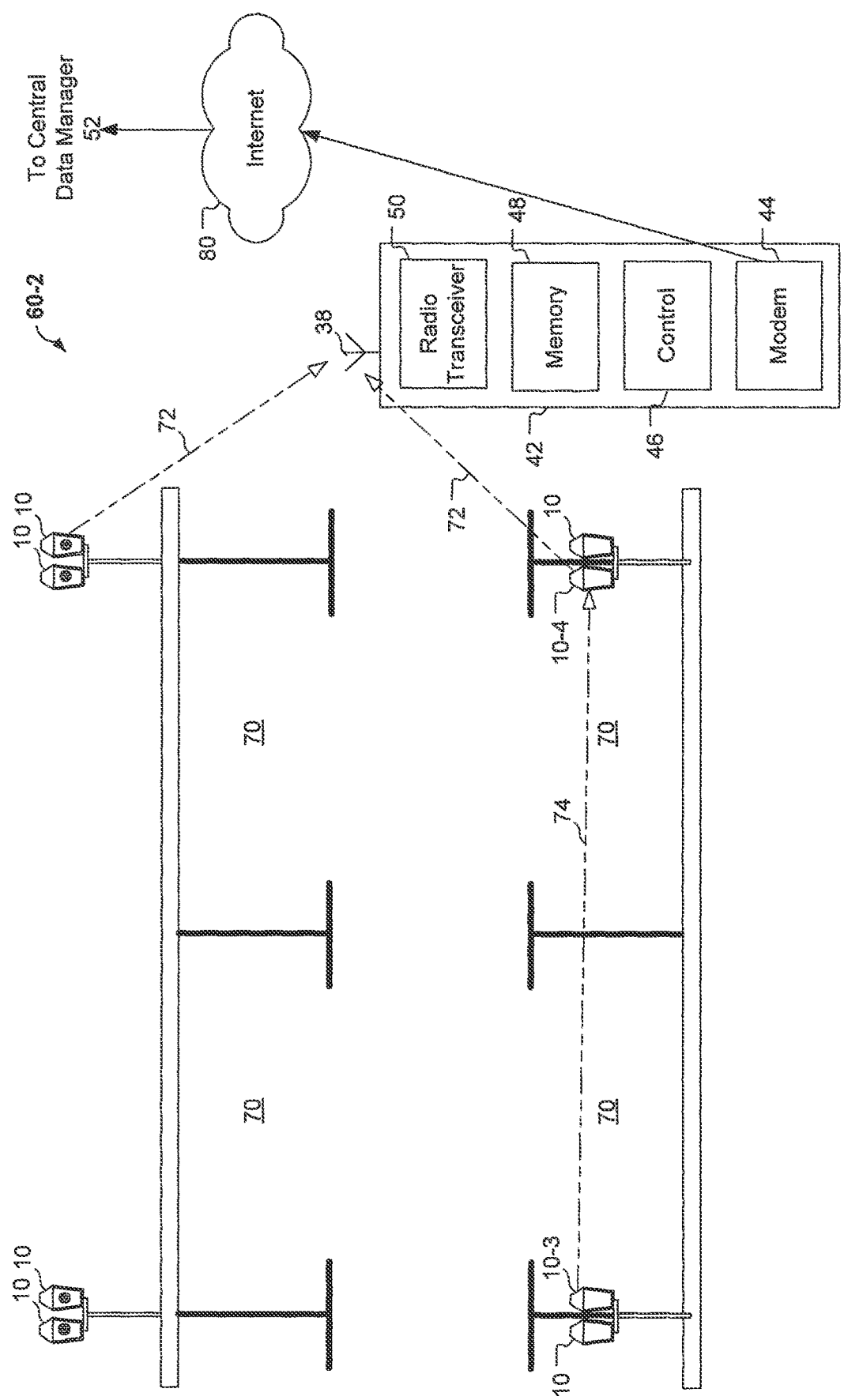
FIG. 5 shows schematically another example of a local group of parking meters that can be monitored by the parking meter system of FIG. 3.

Referring to FIG. 5, another example of a local group 60-2 of parking meters 10 that can be monitored by the parking meter system 40 of FIG. 3 is shown. The local group 60-2 includes eight parking meters 10, but other numbers of parking meters 10 could be included in the local group 60-2. Each parking meter 10 is fixedly located at and associated with a parking spot 70 (only four of the eight parking spots 70 are shown). The parking spots 70 are parallel parking spots that can be located on a street, for example.

The parking meters 10 each include a removable meter unit 16, such as the removable meter unit 16-2 illustrated in FIG. 2B, that includes a network transceiver 31. The eight parking meters 10 communicate, via the network transceiver 31 with the antenna 38 and the radio transceiver 50 of the local data manager 42. The parking meters 10 can communicate directly with the local data manager 42, as illustrated by connections 72, or indirectly (e.g., using a mesh network) via one of the other parking meters 10, as illustrated by connection 74 between parking meters 10-3 and 10-4. As discussed above, the removable meter units communicate information to the local data manager 42, the information including tag IDs, removable meter unit IDs, payment collection information including currency received and credit/debit card information. The removable meter units 16 can also receive configuration information such as operating parameters from the local data manager 42 upon installation or when the operating parameters are updated.

Figure 6:
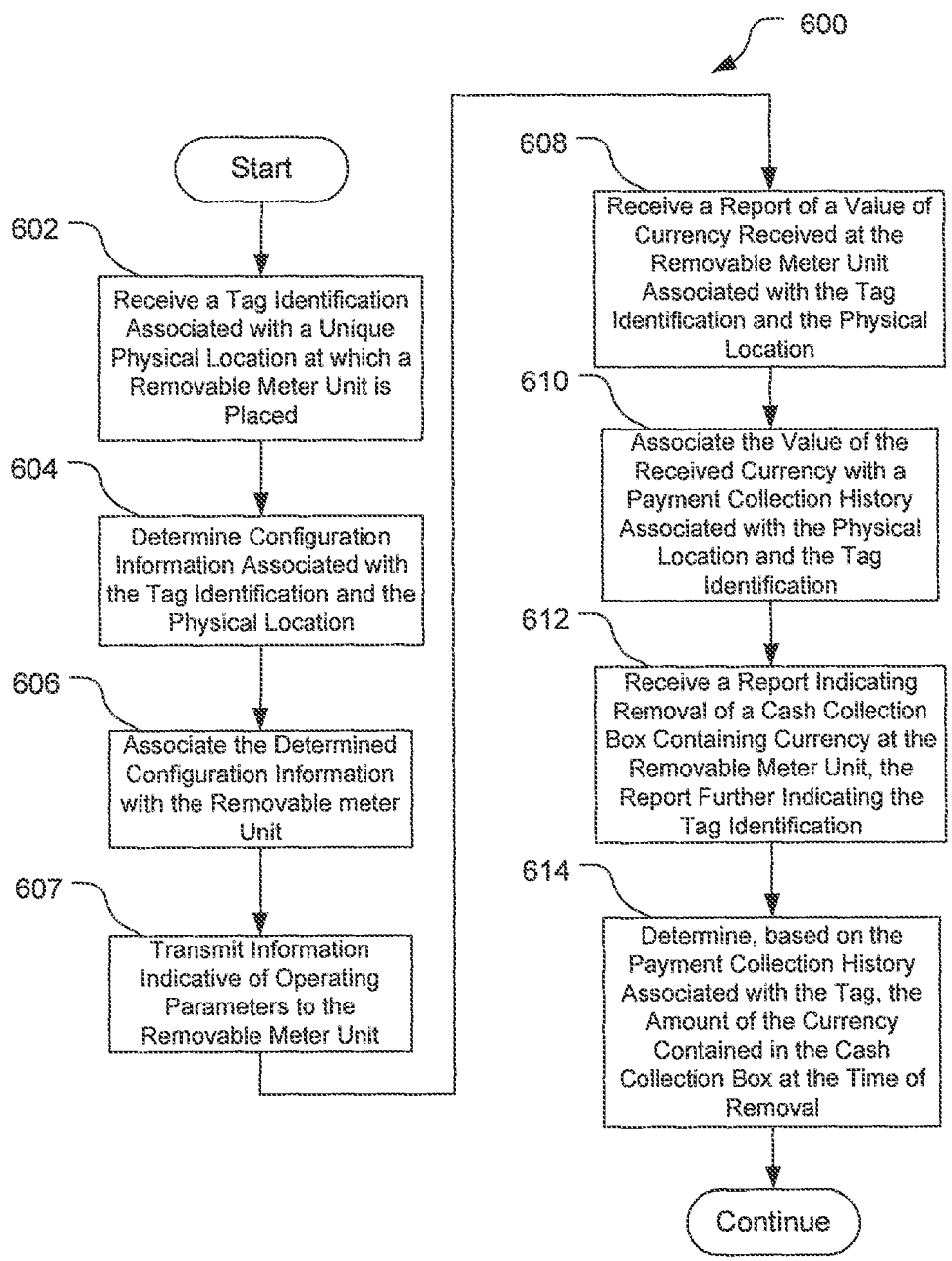
FIG. 6 shows a flowchart of a process for operating parking meters such as the parking meters of FIGS. 1A and/or 1B in the system of FIG. 3.

Referring to FIG. 6, a flowchart of an embodiment of a process 600 for operating parking meters 10 such as the parking meters 10-1 and 10-2 of FIGS. 1A and/or 1B in the system 40 of FIG. 3 is shown. The process 600 includes operations performed by one or more of the local data manager 42 and the central data manager 52. For the sake of clarity, the process 600 is described as being performed by the local data manager 42, but it could also be performed at least in part by the central data manager 52.

The process 600 starts at block 602, where the radio transceiver 50 receives a tag ID that is associated in a data manager database with a unique physical location (e.g., one of the parking spots 70) at which a removable meter unit 16 (e.g., the removable meter unit 16-1 or 16-2 of FIG. 1A or 1B, respectively) is placed. The tag ID received at block 602 can be received directly from the removable meter unit 16 that is placed at the unique physical location or, alternatively, can be received from an intermediate removable meter unit 16 and/or an intermediate data manager (e.g., a local data manager 42) and/or the central data manager 52.

As discussed above, the tag ID can be received at block 602 when a removable meter unit 16 is installed into a location housing 12 that is fixedly located and associated with the unique location.

After the tag ID is received at block 602, processing continues at block 604, where the control device 46 of the local data manager 42 determines configuration information associated with the tag ID and the unique physical location. The configuration information can include a transaction history and/or operating parameters associated with the tag ID and the unique physical location. The configuration information can be stored in the memory 48 of the local data manager 42 or in the data store 58 of the central data manager 52. The configuration information is stored cross-referenced with the associated tag IDs, which are cross-referenced to the unique physical locations. In one embodiment, the stored location information comprises a hierarchical structure such as, for example, a parking spot number, on a particular street, in a predetermined zone of a given city. In another embodiment, the location information comprises GPS location information including latitude and longitude coordinates.

Upon determining the associated configuration information, the process 600 continues at block 606, where the control device 46 associates the determined configuration information with the removable meter unit 16. This association can be accomplished using a removable meter unit ID that identifies the removable meter unit that is located at the unique location. In one embodiment, the removable meter unit ID is received along with the tag identification at the block 602.

The transaction information of payment collection history that is associated with the removable meter unit at block 606 can be an existing payment collection history that was previously associated with another removable meter unit 16. Since the location housing 12 permanently receives the tag 18, the unique physical location remains associated with the tag ID and only the removable meter unit ID association changes. Thus, the payment collection history of the unique location is associated with the new removable meter unit ID and the payment collection history can be updated.

In embodiments where the configuration information includes configuration-related operating parameters (e.g., a parking rate, geographic location, parking rules, amount of currency in a cash box, and times when parking rates or rules apply), the process 600 continues at block 607 where the radio transceiver 50 automatically transmits information indicative of the configuration-related operating parameters to the removable meter unit 16. Such transmission can be initiated upon replacement of the meter unit or at predetermined times or in response to an event, or by a combination of all. That is, block 607 can be performed when the removable meter unit 16 is first installed and/or whenever the configuration-related operating parameters are changed. In this way, the removable meter unit 16 is automatically configured.

Upon associating the removable meter unit ID with the transaction information of payment collection history at block 606, and in some embodiments transmitting the operating parameters at the block 607, the process 600 continues at block 608 where the local data manager 42 monitors the local group 60 to receive, via the radio transceiver 50, a report of a value of currency received at the removable meter unit 16. The report of the value of currency at each meter unit 16 received at block 608 also includes the associated tag ID. Using the tag ID and the cross-reference database information stored in the memory 48, the control device 46 can determine that the received report of the value of currency received is associated with the unique physical location where the tag 18 and the removable meter unit 16 are located.

Upon receiving the report of the value of currency received, the process 600 continues operation to block 610, where the control device 46 associates the value of the received currency with the payment collection history and transaction information associated with the physical location and the tag ID. The association operation at block 610 can include incrementing a total value received register to reflect the newly received value and storing the updated total value. Other information that can be stored can include the date and time of day that the payment was received. Such time of day and date information can be used to modify pricing based on different demand levels measured at different times of day and/or year.

The local data manager 610 continues to perform the functions at the blocks 602-610 until the cash collection box 14 is removed from the parking meter 10. At block 612, the radio transceiver 50 receives a report indicating the removal of the cash collection box 14 containing currency at the removable meter unit 16. The report received at block 612 indicates the tag ID that is associated with the unique physical location where the cash collection box 14 was removed.

Upon receiving the indication that the cash collection box 14 was removed at block 612, the process 600 continues to block 614, where the control device 612 determines, based on the payment collection history associated with the tag ID and stored in the memory 48, the amount of currency that should be contained in the cash collection box at the time of removal. This amount of currency can be used to check collection operations. For example, the expected amount can be used to determine if the person collecting the currency returns an amount that is approximately as expected and can therefore assist in preventing or detecting theft. Additionally, the control device 46 can zero-out or reset the payment collection history transaction information at the block 614.

The blocks 602 through 614 of the process 600 continue to be performed by the various modules of the local data manager 42 as needed. As discussed above, the process 600 can also be performed wholly or in part by the central data manager 52. It should be noted that one or more of the blocks of the process 600 can be rearranged, combined, or omitted.

The systems and methods discussed above involved the use of parking meters located and associated with specific parking spot locations. It should be noted that the above methods and systems are applicable to other scenarios where a measurable quantity of product or an occupied space or an amount of measurable time that a product is being consumed is associated with a meter at a unique physical location. Such scenarios may include, for example, consumption of a product at a customer station, or consumption of a resource at a production location, or waiting time at a specific location, and the like.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, and the like. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, and the like may be passed, forwarded, or transmitted via any suitable means including memory sharing, message passing, token passing, network transmission, and so forth.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information.

While the principles of the disclosure have been described above in connection with specific apparatuses and methods, it is to be clearly understood that this description is made only by way of example and not as limitation on the scope of the disclosure.

We claim:

1. A data manager for a vehicle parking control system, the data manager comprising: a database comprising parking meter information, a network interface, at least one processor, and instructions executable to cause the at least one processor to perform operations comprising:
   a) receiving, at the network interface, tag identification information, the tag identification information originating from an association of: i) a housing fixedly placed at a unique physical location and comprising an RFID tag, and ii) a removable meter unit comprising a wireless transceiver and configured to mate with the housing and wirelessly receive the tag identification information from the RFID tag periodically, in response to an event, or both, the tag identification information associated with the unique physical location;
   b) retrieving, from the database, configuration information comprising one or more operating parameters using the tag identification information; and
   c) transmitting, using the network interface, the configuration information.

2. The data manager of claim 1, wherein the housing and the removable meter unit are components of a single-space parking meter, a dual-space parking meter, or a pay-station parking meter.

3. The data manager of claim 1, wherein the operations further comprise receiving, at the network interface, current configuration information.

4. The data manager of claim 3, wherein the current configuration information comprises one or more of: a status report and a fault report.

5. The data manager of claim 1, wherein the operations further comprise receiving, at the network interface, an acknowledgement of receipt of the configuration information.

6. The data manager of claim 1, wherein the wireless transceiver wirelessly receives the tag identification information from the RFID tag periodically at predetermined times.

7. The data manager of claim 1, wherein the event comprises one or more of:
   a) installation of a removable meter unit into a housing,
   b) replacement of a removable meter unit,
   c) removal of a removable meter unit from the housing,
   d) accessing a cash collection box within a housing, and
   e) update of the configuration information or the operating parameters in the database of the data manager.

8. The data manager of claim 1, wherein the operating parameters include one or more of: a parking rate, a geographic location, parking rules for operation, an amount of currency in a cash box, and times when parking rates or rules apply.

9. The data manager of claim 1, wherein the configuration information further comprises a software update.

10. A vehicle parking control system comprising:
    a) a plurality of parking meters, each parking meter comprising:
       a housing fixedly placed at a unique physical location and comprising an RFID tag storing tag identification information associated with the unique physical location; and
       ii. a removable meter unit configured to mate with the housing and wirelessly receive the tag identification information from the RFID tag and comprising a wireless transceiver configured to transmit the tag identification information periodically, in response to an event, or both; and
    b) a remote data manager comprising a database comprising parking meter information, a network interface, at least one processor, and instructions executable to cause the at least one processor to perform operations comprising:
       i. receiving, from the wireless transceiver of the removable meter unit using the network interface, the tag identification information;
       ii. retrieving, from the database, configuration information comprising one or more operating parameters using the tag identification information; and
       iii. transmitting, to the wireless transceiver of the removable meter unit using the network interface, the configuration information.

11. The vehicle parking control system of claim 10, wherein the plurality of parking meters comprises: one or more single-space parking meters, one or more dual-space parking meters, or one or more pay-station parking meters.

12. The vehicle parking control system of claim 10, wherein the operations further comprise receiving, from the wireless transceiver of the removable meter unit using the network interface, current configuration information.

13. The vehicle parking control system of claim 12, wherein the current configuration information comprises one or more of: a status report and a fault report.

14. The vehicle parking control system of claim 10, wherein the operations further comprise receiving, from the wireless transceiver of the removable meter unit using the network interface, an acknowledgement of receipt of the configuration information.

15. The vehicle parking control system of claim 10, wherein the wireless transceiver transmits the tag identification information periodically at predetermined times.

16. The vehicle parking control system of claim 10, wherein the event comprises one or more of:
    a) installation of a removable meter unit into a housing,
    b) replacement of a removable meter unit,
    c) removal of a removable meter unit from the housing,
    d) accessing a cash collection box within a housing, and
    e) update of the configuration information or the operating parameters in the database of the data manager.

17. The vehicle parking control system of claim 10, wherein the wireless transceiver utilizes a cellular telephone network, a wireless LAN, a mesh network, a Wi-Fi network, a WiMAX network, a WPAN, or the Internet.

18. The vehicle parking control system of claim 10, wherein the operating parameters include one or more of: a parking rate, a geographic location, parking rules for operation, an amount of currency in a cash box, and times when parking rates or rules apply.

19. The vehicle parking control system of claim 10, wherein the configuration information further comprises a software update.

20. The vehicle parking control system of claim 10, wherein the parking meters are associated with one or more local data managers to form one or more local groups, and wherein the one or more local data managers in communication with the remote data manager.

* * * * *